Figure 1:
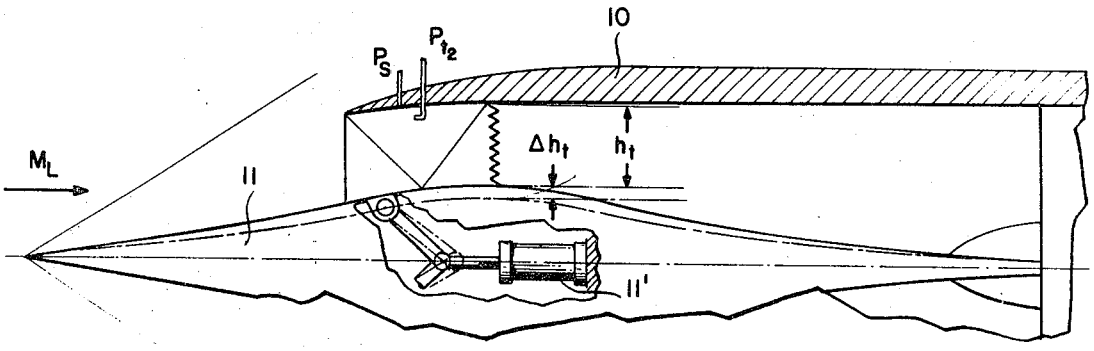
Figure 2:
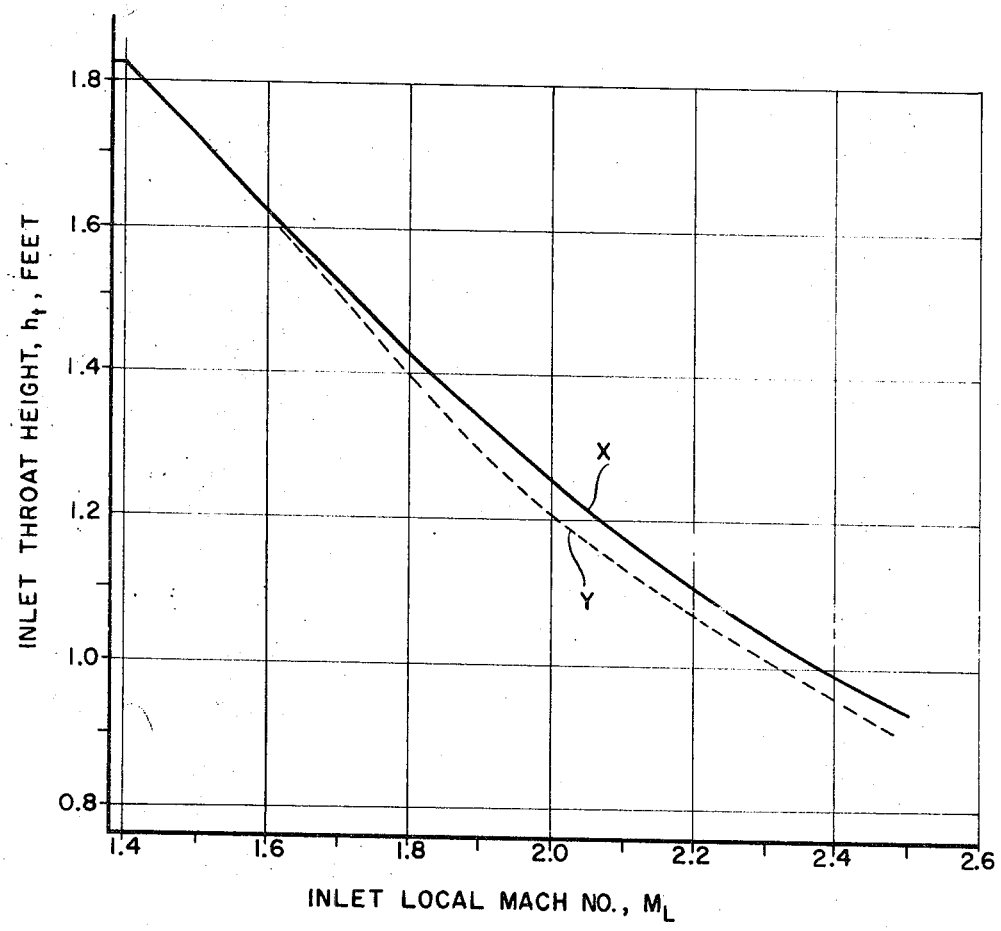
Figure 3:
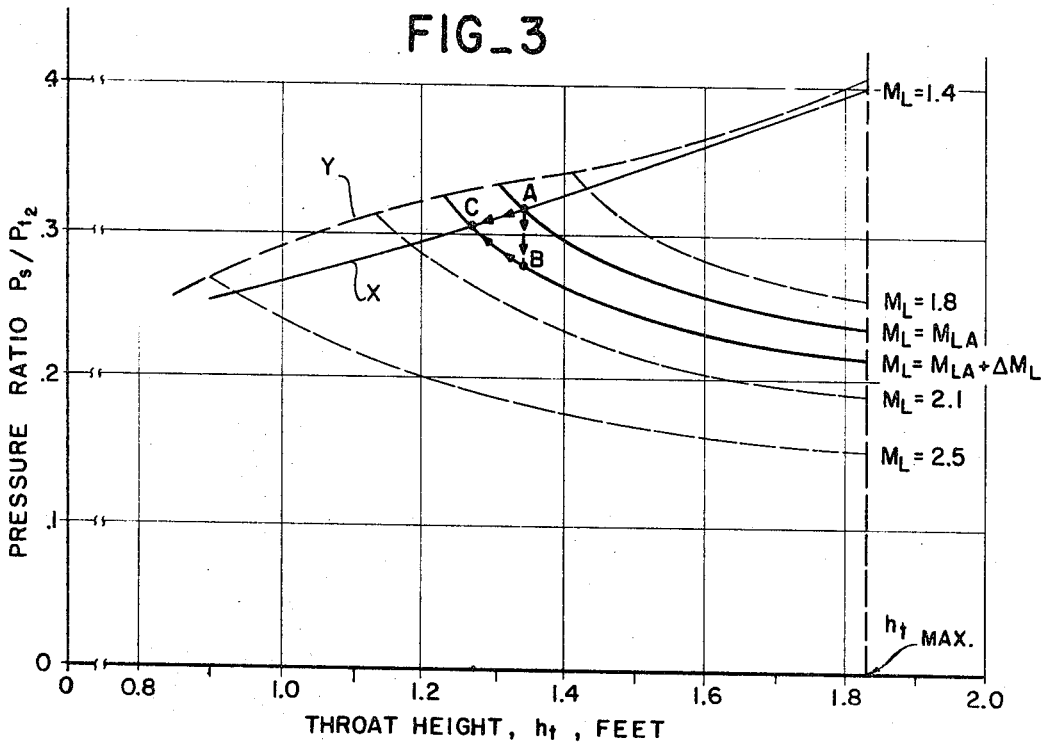
Figure 4:
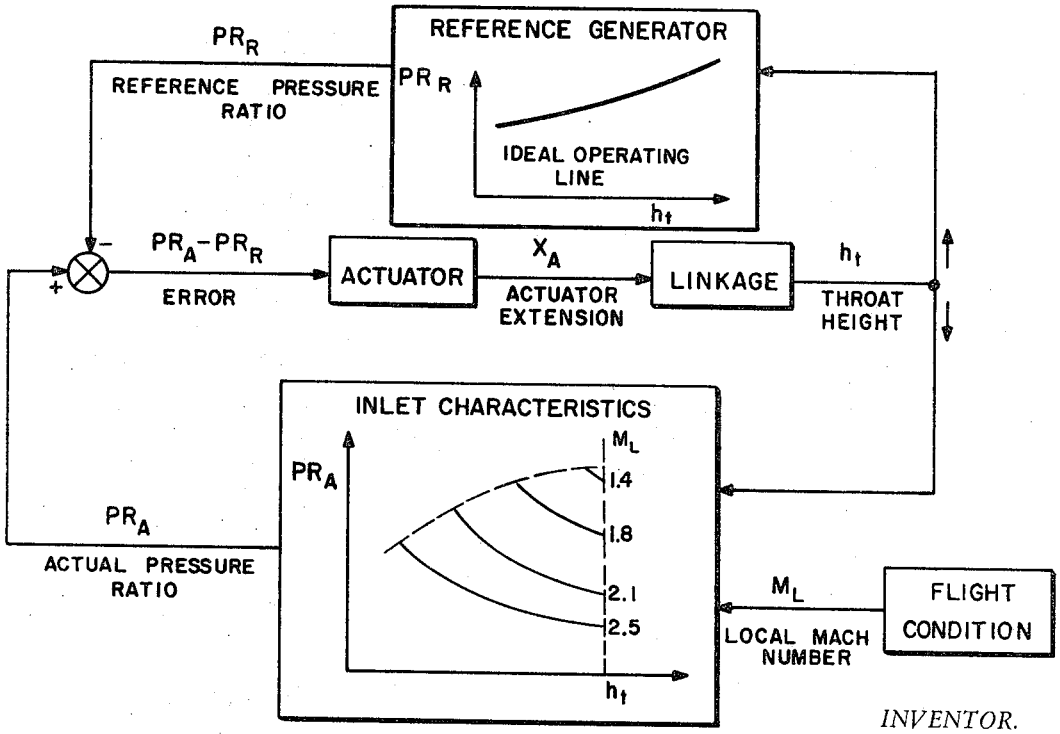
Figure 5:
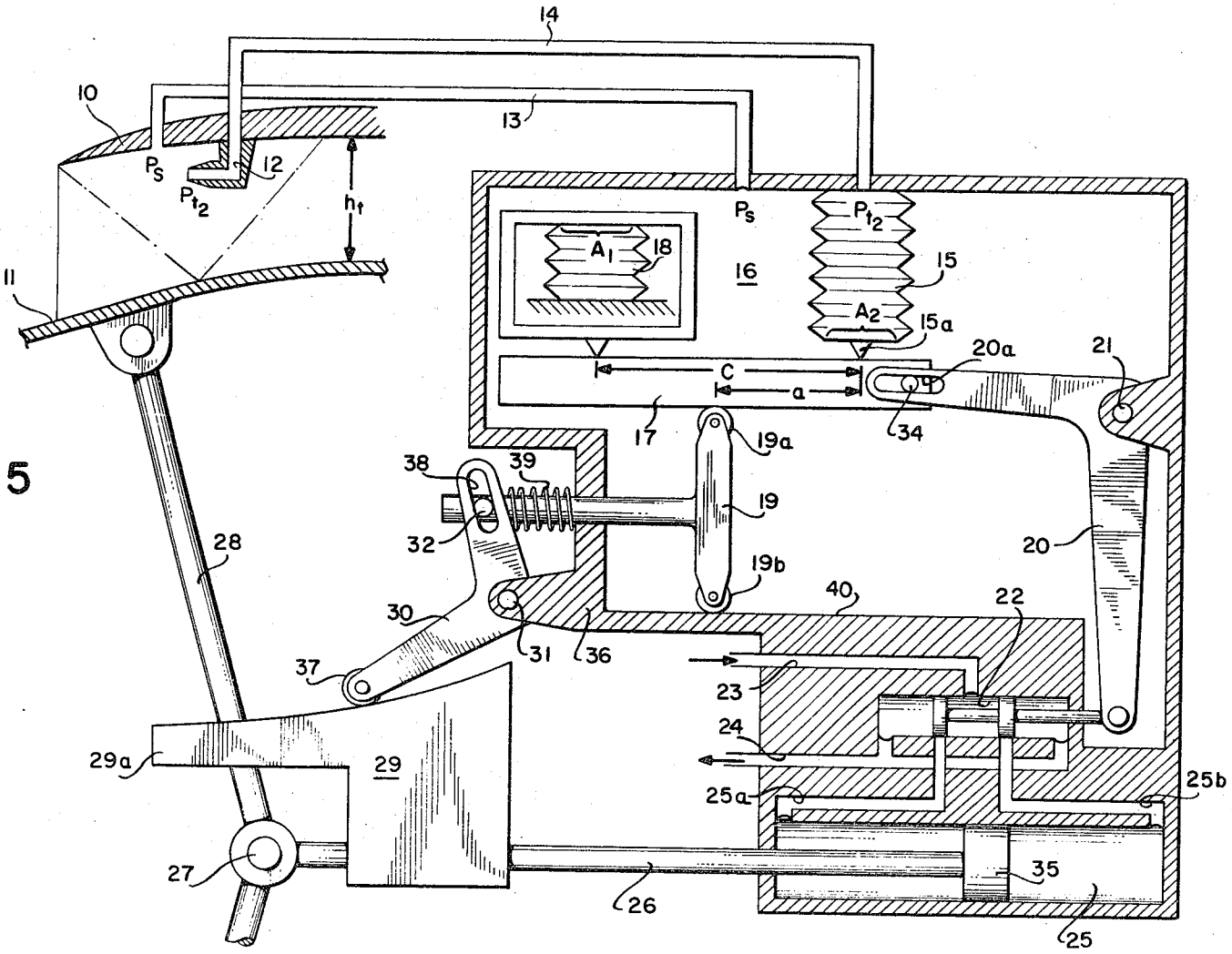
Figure 6:
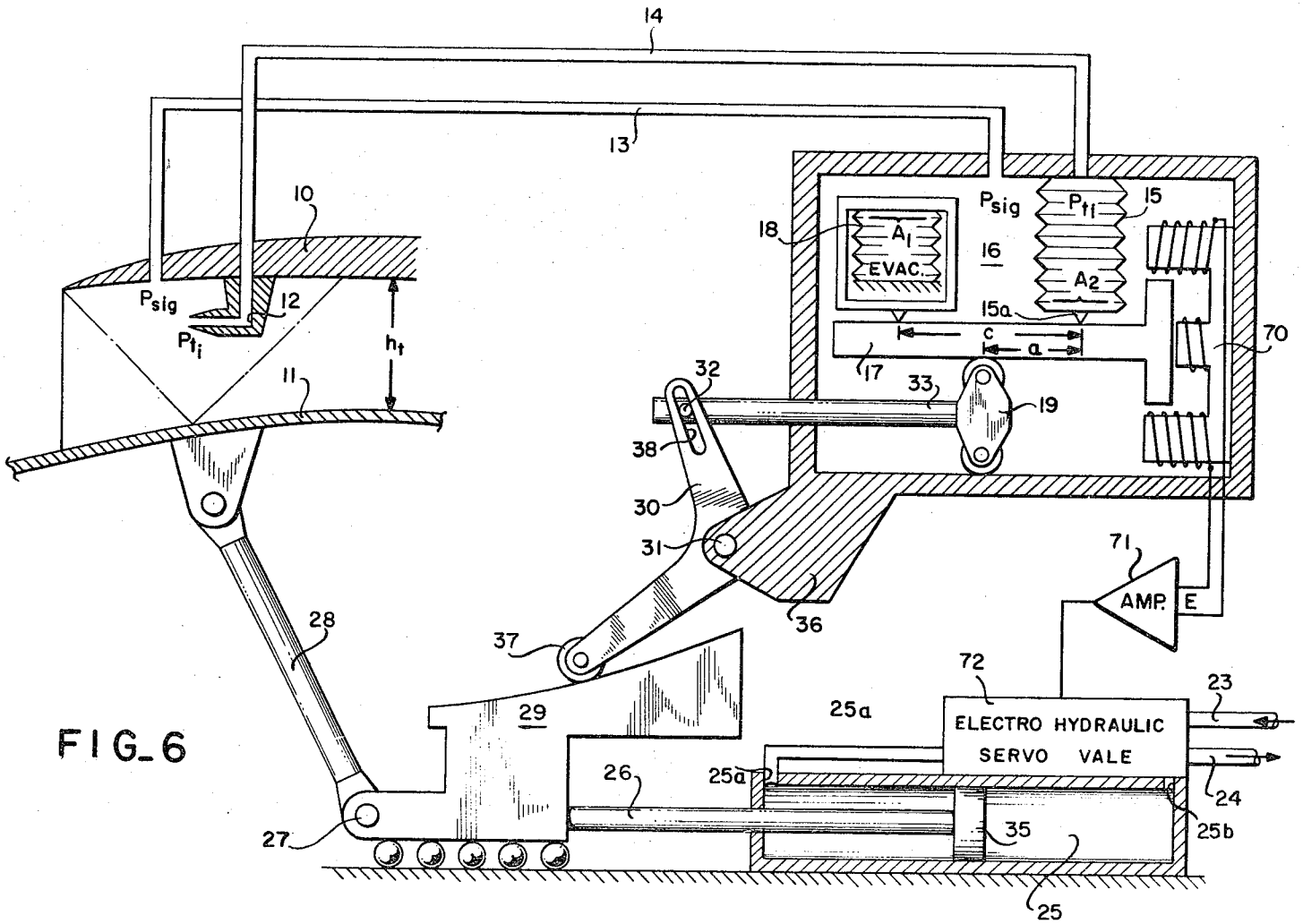
Figure 7:
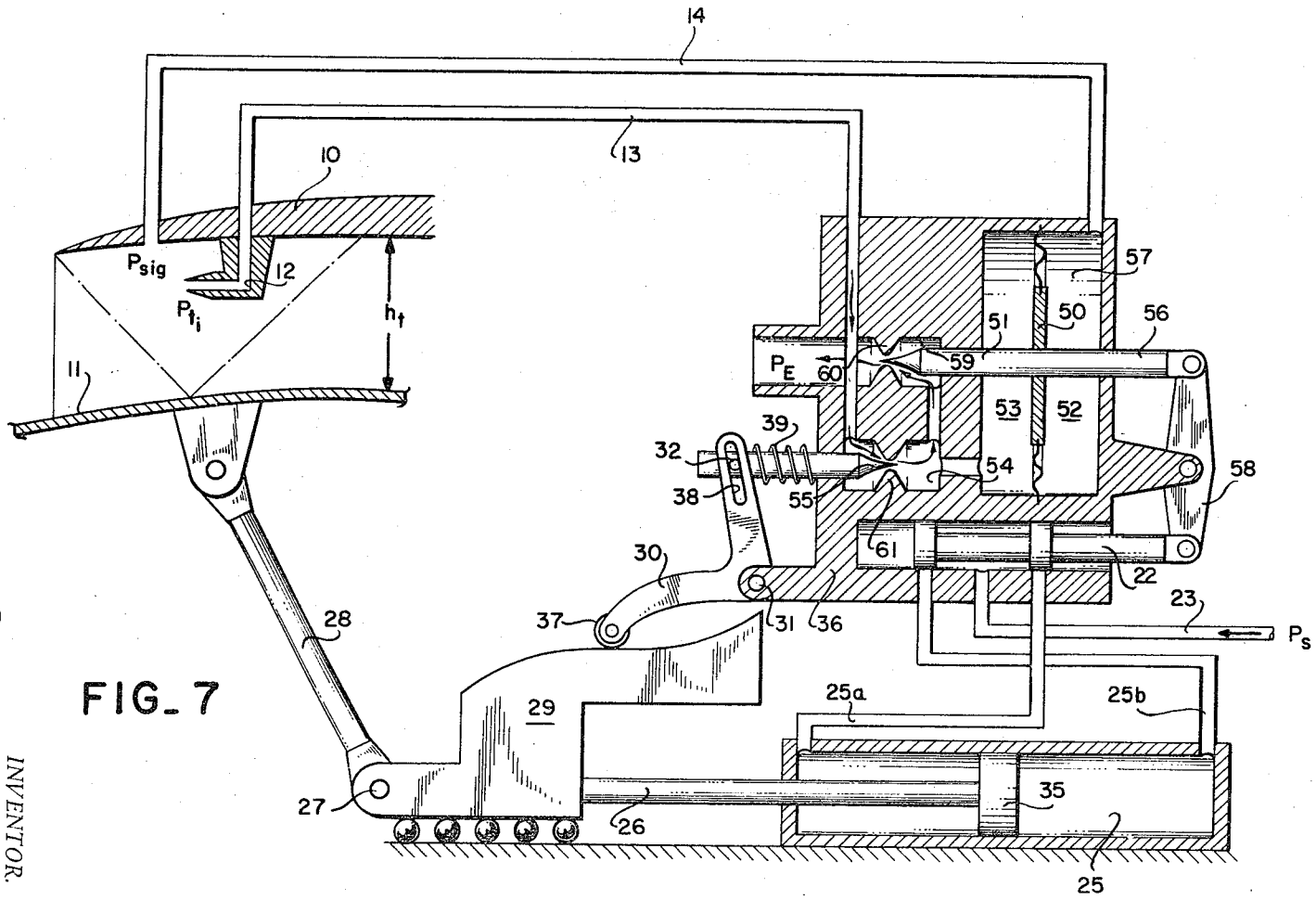

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 16, 1970

875 O.G. 361

T875,015

INLET CONTROL SYSTEM FOR SUPERSONIC AIRCRAFT

Robert C. Loschke, Glendale, Calif., assignor, by mesne assignments, to the United States of America as represented by the Administrator of the Federal Aviation Administration

Continuation of application Ser. No. 619,320, Feb. 28, 1967. This application Aug. 20, 1969, Ser. No. 853,601

Int. Cl. F02k *11/00*

U.S. Cl. 137—1

5 Sheets Drawings. 19 Pages Specification

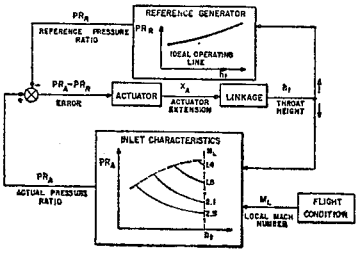

A method and apparatus for controlling the inlet area of a variable geometry engine inlet. The method for controlling the inlet area includes (a) measuring the actual pressure ratio of the engine inlet; (b) varying the inlet area in response to a change in the actual pressure ratio; (c) generating a reference pressure ratio which is a function of the inlet area; and (d) balancing the actual pressure ratio with the reference pressure ratio. This balancing of the actual and reference pressure ratios is carried out through a feedback mechanism from the engine plant to the reference generating means.

INLET CONTROL SYSTEM FOR SUPERSONIC AIRCRAFT

Original Filed Feb. 28, 1967 5 Sheets-Sheet 1

INVENTOR.
ROBERT C. LOSCHKE
BY George C. Sullivan
Agent

INLET CONTROL SYSTEM FOR SUPERSONIC AIRCRAFT

Original Filed Feb. 28, 1967 5 Sheets-Sheet 2

INVENTOR.
ROBERT C. LOSCHKE

BY George C. Sullivan
Agent

INLET CONTROL SYSTEM FOR SUPERSONIC AIRCRAFT

Original Filed Feb. 28, 1967 5 Sheets-Sheet 3

INVENTOR.
ROBERT C. LOSCHKE
BY George C. Sullivan
Agent

INLET CONTROL SYSTEM FOR SUPERSONIC AIRCRAFT

Original Filed Feb. 28, 1967 5 Sheets-Sheet 4

INVENTOR.
ROBERT C. LOSCHKE
BY George C. Sullivan
Agent

INLET CONTROL SYSTEM FOR SUPERSONIC AIRCRAFT

Original Filed Feb. 28, 1967 5 Sheets-Sheet 5

INVENTOR.
ROBERT C. LOSCHKE
BY George C. Sullivan
Agent